United States Patent
Schindler et al.

(10) Patent No.: US 7,635,234 B2
(45) Date of Patent: Dec. 22, 2009

(54) COUPLING ELEMENT OF A SUPPORT ARM SYSTEM

(75) Inventors: Timo Schindler, Bischoffen (DE); Markus Neuhof, Ehringshausen-Niederlemp (DE)

(73) Assignee: Rittal GmbH & Co. KG, Herborn (DE)

( * ) Notice: Subject to any disclaimer, the term of this patent is extended or adjusted under 35 U.S.C. 154(b) by 0 days.

(21) Appl. No.: 11/986,672

(22) Filed: Nov. 21, 2007

(65) Prior Publication Data

US 2008/0145143 A1 Jun. 19, 2008

(30) Foreign Application Priority Data

Nov. 24, 2006 (DE) ........................ 10 2006 055 940

(51) Int. Cl.
*F16B 9/00* (2006.01)

(52) U.S. Cl. .................... 403/192; 403/78; 403/134; 248/278.1

(58) Field of Classification Search .................... 403/78, 403/134, 192, 195, 164, 165, 370, 371, 235, 403/262; 16/2.1, 2.3, 2.4; 248/125.7, 278.1, 248/282.1, 291.1, 324; 277/616, 624, 622, 277/910
See application file for complete search history.

(56) References Cited

U.S. PATENT DOCUMENTS 4,997,155 A * 3/1991 Reuter et al. ............. 248/278.1
D323,323 S * 1/1992 Klaebel ...................... D14/452
5,174,680 A * 12/1992 Nakamura et al. ........... 403/370
5,303,893 A * 4/1994 Schuler et al. .......... 248/288.51
5,437,483 A * 8/1995 Umezawa ................... 285/308
5,478,044 A * 12/1995 Hyde ......................... 248/638
5,533,763 A * 7/1996 Neuhof .................... 285/179.1
6,095,467 A * 8/2000 Neuhof .................... 248/278.1
6,095,468 A * 8/2000 Chirico et al. ............ 248/282.1
6,328,270 B1 * 12/2001 Elberbaum ............. 248/288.31
6,457,720 B1 * 10/2002 London ....................... 277/370
6,783,298 B2 * 8/2004 Root et al. .................. 403/315
6,817,585 B2 * 11/2004 Wagner et al. .............. 248/324
7,278,799 B2 * 10/2007 Grape et al. .................... 403/1

FOREIGN PATENT DOCUMENTS

DE        38 05 422 C1   12/1988
DE        41 19 508 C2    8/1993

* cited by examiner

*Primary Examiner*—Daniel P Stodola
*Assistant Examiner*—Joshua T Kennedy
(74) *Attorney, Agent, or Firm*—Pauley Petersen & Erickson

(57) ABSTRACT

A coupling element for connecting a housing or a support arm system element with a support arm. The coupling element has a hollow cylinder-shaped receiving element fixed in place on the housing or the support arm system element for receiving and fixing in place the support arm in the axial direction. So that the coupling element can meet the requirements made on its employment in the field connected with health, the receiving element is covered by a cup-shaped cover which has a central through-opening for passing the support arm through and which has an edge area circumferentially supported on the receiving element. The through-opening is sealed against the exterior circumferential face of the support arm, and the edge area of the cover is sealed against the receiving element.

27 Claims, 3 Drawing Sheets

COUPLING ELEMENT OF A SUPPORT ARM SYSTEM

BACKGROUND OF THE INVENTION

1. Field of the Invention

This invention relates to a coupling element of a support arm system for connecting a housing or a support arm system element with a support arm. The coupling element has a substantially hollow cylinder-shaped receiving element, fixed in place on the housing or the support arm system element, for receiving and fixing in place the support arm in the axial direction.

2. Discussion of Related Art

A coupling element for connecting a support arm or a support arm system is known from German Patent Reference DE 41 19 508 C2, for example. The support arm of this coupling element is attached by a screw connection to a receiving element. The receiving element is connected with a rotary coupling, which allows pivoting of the control device housing relative to the housing, about a vertical pivot shaft.

A support arm system is for example known from German Patent Reference DE 38 05 422 C1, which is constructed from support arm elements including support arms, intermediate joints, angle pieces, installed wall elements or housing couplings of a support arm system.

In connection with such coupling element there is one disadvantage that, because of the complicated construction, elevations and depressions, such as edges, grooves, undercuts and the like are formed, can easily become soiled. In particular, dirt can accumulate in depressions or edge or corner areas. For this reason, such coupling elements are suitable only in a limited way in the field connected with health, for example in the food industry or in hospitals. For one, devices used in the field connected with health must be designed so that no excessive or persistent soiling can occur. Also, such devices must be easy to clean without becoming damaged, for example by making use of a steam jet cleaning device.

SUMMARY OF THE INVENTION

It is one object of this invention to provide a coupling element which does not easily get soiled and that can be cleaned in a simple manner. Such a device coupling should also be usable in the field connected with public health.

This object is attained with a coupling element having the characteristics and developments described in this specification and in the claims.

Accordingly, the receiving element is covered by a substantially cup-shaped cover, so that the contact area with the support arm, which is prone to soiling, is covered toward the exterior. Also, further components required for fixing the support arm in place, are covered by the cover. For one, this prevents excessive soiling and furthermore allows simple cleaning.

The cover has a central through-opening through which the support arm can pass. Prior to assembly, the cover is simply pushed onto the free end of the support arm where it is connected, and following assembly, it is placed on the receiving end by displacing it in the direction toward the coupling element. Here, the edge area of the cover is circumferentially supported on the receiving element. In order to provide an effective sealing against the exterior, the through-opening is sealed against the exterior circumferential face of the support arm, and the edge area of the cover is sealed with respect to the receiving element.

A particularly simple cover can be obtained if a circumferential sealing element is arranged between the exterior circumferential face of the support arm and the interior edge area of the through-opening formed in the cover. This sealing element can seal the cover against the support arm.

In order to assure a particularly good support in the sealed position, the circumferential sealing element is supported on the receiving element. This support, or the axial fixation of the circumferential sealing element, can be achieved if a spacer is arranged on the side of the cover facing away from the receiving element, which has a central through-opening for passing the support arm through and which is supported on the receiving element. Support can be realized in a simple manner if the spacer is supported on the receiving element by a plurality of spacing elements substantially extending in the axial direction.

In accordance with one simple embodiment, the sealing element can be an O-ring. In a sealing position, the O-ring can be fixed in place in a particularly secure manner in a circumferential recess in the shape of an arc of a circle, or in a groove, at the interior wall area of the through-opening formed in the cover.

Also, for additional sealing against the exterior it is possible to arrange a further circumferential sealing element, which can also be embodied as an O-ring, in the exterior area between the edge area of the cover and the receiving element. Thus, the sealing element can seal the cover against the receiving element.

So that the cover is fixed in place in a particularly stable manner on the receiving element, a circumferential, step-shaped recess, which forms a shoulder, can be embodied on the edge area facing the cover. The edge area of the cover is received in the step-shaped recess. Shifting of the cover transversely with respect to the axial direction is effectively prevented by engagement of the cover in the circumferential, step-shaped recess in the receiving element.

The cover can also be secured on the receiving element against shifting in the axial direction if an exterior screw thread is formed on the circumferential, step-shaped recess in the receiving element, and a corresponding interior screw thread is formed on the inner edge area of the cover, so that the cover can be screwed onto the receiving element.

The sealing element sealing the cover against the receiving element can be arranged between the edge area of the cover and the circumferential, step-shaped recess. Thus, dependable sealing is achieved by plugging or screwing the cover on the receiving element.

In order to achieve additional support of the cover on the receiving element, and simultaneously also still further improved sealing, a circumferential, step-shaped recess can be formed on the inner edge area of the cover, on which the cover is supported on the edge area of the receiving element facing the cover.

The receiving element can also be sealed against the housing in order to prevent dirt from becoming lodged between the receiving element and the housing. It is thus possible to arrange a circumferential sealing element between the edge area of the receiving element facing the housing and the housing.

So that the sealing element is securely fixed in place in its sealing position, a circumferential, step-shaped recess can be formed in the edge area of the receiving element facing the housing, in which the circumferential sealing element is arranged and supported on the housing.

A particularly simple connection between the support arm and the coupling element can be created if a connecting adapter having a clamping or screwing connection for fixing the support arm in the axial direction is embodied on the receiving element between the support arm and the coupling element. In accordance with one embodiment, a tapered or conical clamping connection for fixing the support arm in place in the axial direction can be embodied on the receiving element. In the course of assembly, the support arm can be connected in a particularly simple manner by a connecting adapter.

So that the support arm can be turned around a rotational axis extending in the axial direction, a swivel joint can be arranged in the edge area of the receiving element facing the housing. The swivel joint fixes the receiving element in place on the housing in the axial direction and allows the rotation of the receiving element around an axis of rotation extending in the axial direction. Because the support arm is fixedly maintained in the receiving element, the support arm can also perform this rotating movement.

To assure that no dirt enters the swivel joint, the circumferential sealing element can seal the swivel joint against the housing, wherein the receiving element or the housing can be rotated with respect to the sealing element. Thus, it is possible to achieve a dependable seal in spite of a rotation of the receiving element relative to the housing.

BRIEF DESCRIPTION OF THE DRAWINGS

This invention is explained in greater detail, making reference to the attached drawings, wherein.

DETAILED DESCRIPTION OF THE INVENTION

Figure 1:
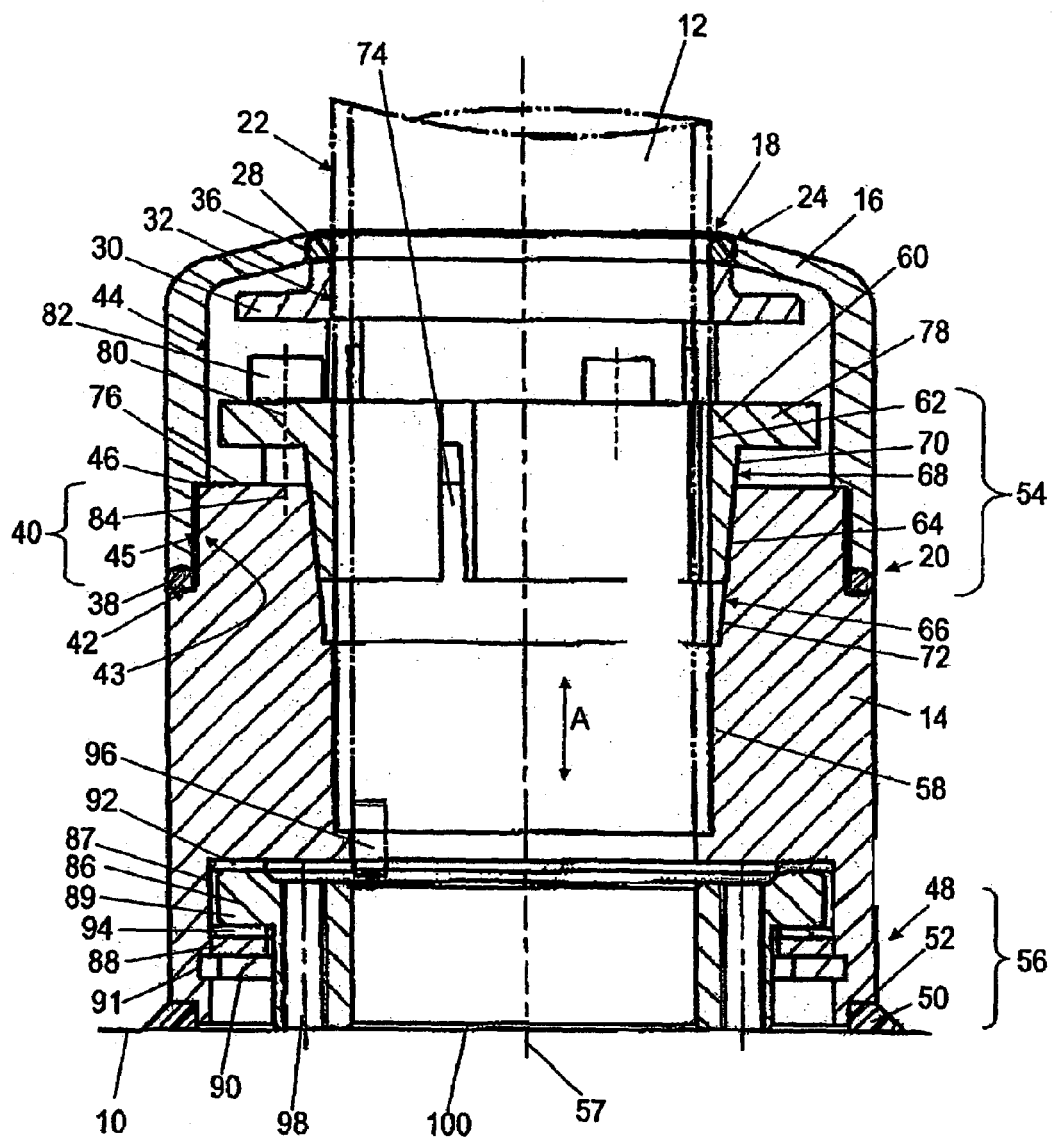
FIG. 1 is a schematic plan view and longitudinal section taken along a center vertical line, a coupling element in accordance with this invention, which is attached to a control device housing and receives a support arm.
Figure 2:
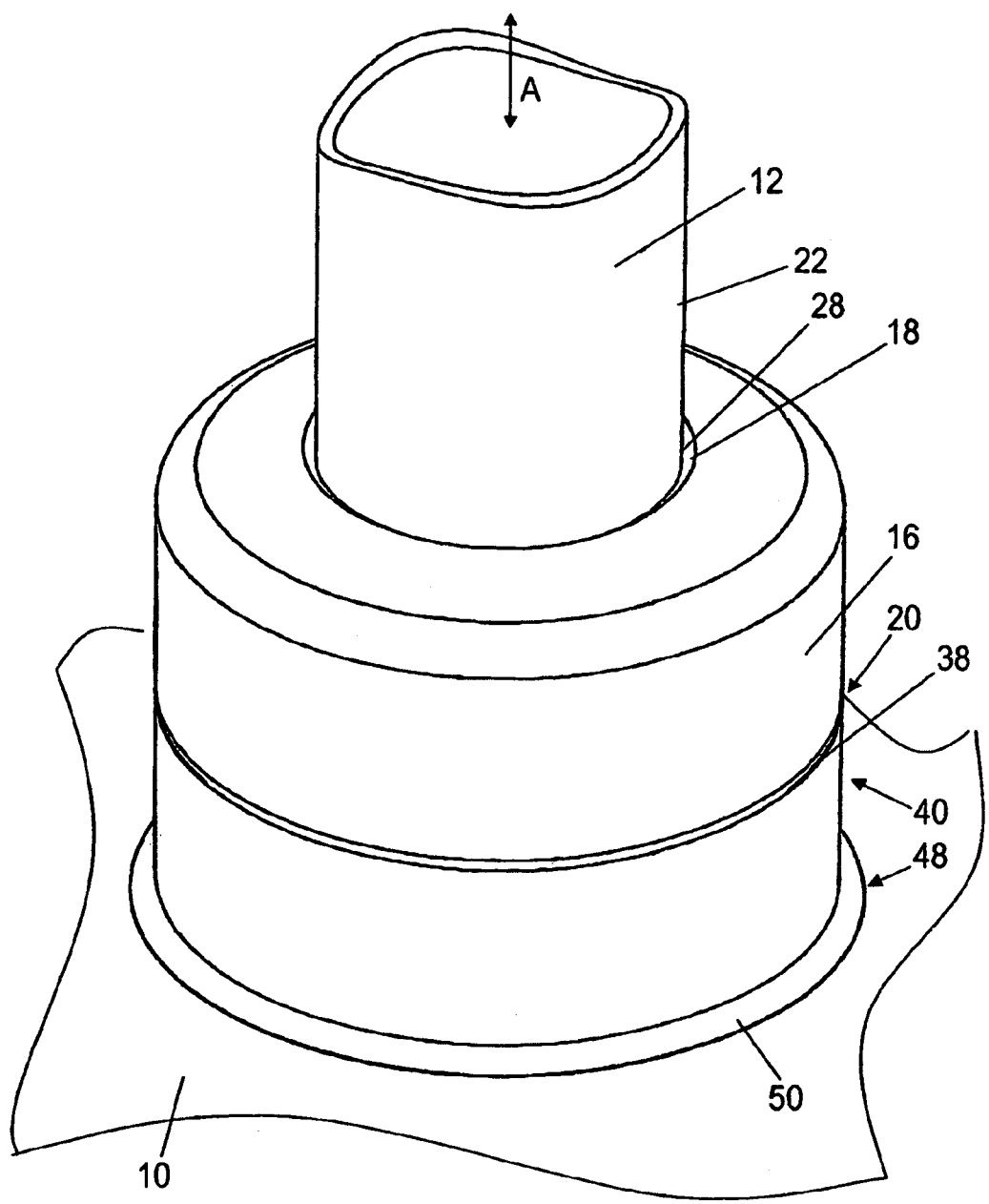
FIG. 2 shows the coupling element represented in FIG. 1 in a schematic and perspective plan view.

In a schematic plan view and longitudinal section along the center vertical line, FIG. 1 shows a coupling element in accordance with this invention, which is attached to a control device housing 10 and receives a support arm 12. FIG. 2 shows in a schematic and perspective plan view the coupling element represented in FIG. 1.

The support arm 12 represented is embodied as a hollow round profiled section and forms a part of a support system including further (not represented) support arm system parts, which are connected with each other by suitable connecting elements. In this case, the support arm system elements can be installed wall elements, angle pieces, or housing couplings of a support arm system. The control device housing 10 contains a (not represented) touch screen used for inputting operating commands for controlling an electronic device located at the other end of the support arm arrangement. Electronic lines are conducted through the hollow support arm between the touch screen and the electronic device for this purpose. The electronic device can be housed in a switchgear cabinet housing, on which a coupling element as shown in FIG. 1 is also installed and supports the support arm arrangement.

Both the control device housing 10 and the (not represented) switchgear cabinet housing are designed for use in the field connected with health and are optimized for easy cleaning. This also requires that, if possible, the housings are without grooves and edges, in which dirt can collect and remain.

The coupling element is used for connecting the control device housing 10 with the support arm 12. The support arm 12 is received in a hollow cylinder-shaped receiving element 14 fixed in place on the control device housing 10, wherein the support arm 12 is fixed in place in the axial direction identified by the arrow A. The receiving element 14 is covered by a cup-shaped cover 16. A central through-opening 18 is in the cover 16, through which the support arm 12 extends. In FIG. 1, the lower edge area 20 of the cup-shaped cover 16 is supported all around on the receiving element 14.

A circumferential sealing element 28, made of plastic and embodied as an O-ring, is arranged between the exterior circumferential face 22 of the support arm 12 and the interior edge area 24 of the through-opening 18 formed out of the cover 16. The interior edge area of the through-opening 18 formed out of the cover 16 has a circumferential recess, or a groove 36, in the shape of an arc of a circle, in which the sealing element 28 is received and maintained. The sealing element 28 is also supported on the receiving element 14. For this purpose, a spacer 30 is arranged on the side of the cover 16 facing the receiving element 14 for fixing the circumferential sealing element 28 in place. The spacer 30 also has a central through-opening 32, through which the support arm 12 extends. The spacer 30 is supported on the receiving element 14 by a plurality of spacing elements substantially extending in the axial direction, which are not represented in FIGS. 1 and 2.

A circumferential sealing element 38, made of plastic and embodied as an O-ring, is arranged between the edge area 20, which lies at the bottom in FIG. 1, of the cover 16 and the receiving element 14.

A circumferential, step-shaped recess 42, or shoulder, is formed at the upper edge area 40 of the receiving element 14 facing the cover 16, in which the lower edge area 20 of the cover 16 is received. An exterior screw thread 43 is formed on the circumferential, step-shaped recess 42 in the receiving element 14, and an interior screw thread 45 is formed on the interior edge area 20 of the cover 16, so that the cover 16 can be screwed onto the receiving element 14. It is also possible to omit the exterior screw thread 42 and the interior screw thread 45 and to provide a simple plug-in connection between the cover 16 and the receiving element 14, in place of the screw connection.

The sealing element 38 is arranged between the edge area 20 of the cover 16 and the circumferential step-shaped recess 42.

A circumferential step-shaped recess 46 is also formed at the interior edge area 44 of the cover 16, in which the edge area 40 of the receiving element 14 facing the cover 16 is supported.

A circumferential, set-back, step-shaped recess 52 is formed on the lower edge area 48, which faces the housing 10, of the receiving element 14. A circumferential sealing ring 50 made of plastic is arranged in the circumferential recess 52 and is supported on the housing 10.

A connecting adapter 54 having a tapered or conical clamping connection for fixing the support arm 12 in place in the axial direction is embodied in the receiving element 14.

The receiving element 14 has a receiving bore 58 extending in the axial direction. The support arm 12 is inserted in the axial direction into the receiving bore 58.

A sleeve-shaped clamping element 60 is arranged on the support arm 12 and has a central through-opening 62, through which the support arm 12 extends.

The sleeve-shaped clamping element 60 has an exterior diameter which tapers in the direction toward the receiving bore 58, so that an exterior cone 70 is formed on the exterior circumferential face 68 of the clamping element 60. In contrast, the receiving bore 58 has an interior diameter which is correspondingly enlarged in the direction toward the clamping element 60, so that an interior cone 72 is formed on the interior cylinder face 66 of the receiving bore 58. The exterior cone 70 of the clamping element 60 can be brought into an operative connection in the axial direction with the interior cone 72 of the receiving bore 58 in order to fix the support arm 12 in place in a clamping or bracing manner. During this, the clamping element 60 is introduced, at least in part, in the axial direction into the space 64 between the exterior circumferential face 22 of the support arm 12 and the interior cylinder face 66 of the receiving bore 58. In FIG. 1, the exterior cone 70 of the clamping element 60 slides downward along the interior cone 72 of the receiving bore 58 into the space 64. For moving the clamping element 60 downward it is necessary to exert a vertical force from above on the clamping element 60, which is used to overcome the frictional force occurring between the exterior cone 70 and the interior cone 72 and also for generating a horizontal force component in the direction toward the circumferential face 22 of the support arm 12 by a redirection of the force. This horizontal force component is used to deform the clamping element 60 and to push it on the one side against the circumferential face 22 of the support arm 12 and on the other side against the interior surface of the receiving bore 58. Thus, a tapered or conical clamping connection for fixing the support arm 12 in place in the receiving bore 58 is formed. The less flat the wedge angle between the exterior cone 70 and the interior cone 72 is, the less force that needs to be vertically provided.

So that the sleeve-shaped clamping element 60 can be deformed in a particularly simple and definite manner, the clamping element 60 has a longitudinal slit 74 extending in the axial direction, so that the clamping element 60 is upset over its circumference by the effect of the horizontal force component.

On an upper circumferential edge area at the top of FIG. 1, the sleeve-shaped clamping element 60 has a circumferential collar-shaped shoulder 78 extending parallel with the front face 76 of the receiving element 14. A plurality of through-bores extending in the axial direction is applied to the shoulder 78, wherein only the through-bore having the reference numeral 80 is represented in FIG. 1, which will be explained in greater detail in view of all through-bores. For example, a cap screw 82 can be introduced into the through-bore 80. A correspondingly threaded bore 84 is applied to the front face 76 in the receiving element 14, into which the cap screw 82 can be screwed. If all cap screws are introduced into the corresponding threaded bores, a vertically upwardly directed force is exerted on the sleeve-shaped clamping element 60 which, in turn, is redirected into a horizontal force component by the cooperation of the exterior cone 70 and the interior cone 72 and leads to bracing of the clamping element 60.

A swivel joint 56 is arranged on the edge area 48 and faces the housing 10 at the bottom in FIG. 1, of the receiving element 14. The swivel joint 56 fixes the receiving element 14 in place in the axial direction on the housing 10, but allows a limited rotation of the receiving element 14, and therefore also of the support arm 12, around an axis of rotation 58 extending in the axial direction.

The swivel joint 56 has a turning ring 86 received in a blind bore 87 located on the underside of the receiving element 14. The blind bore 87 is installed concentrically with respect to the receiving bore 58 and has a larger diameter than the latter.

The turning ring 86 is attached to the housing 10 fixed in place and is not rotatable by a screw connection 96. In its upper edge area, oriented toward the receiving element 14, the turning ring 86 has a circumferential shoulder 89, which is upwardly supported in the direction toward the receiving element 14 by an upper seating ring 92. Toward the bottom, the circumferential shoulder 89 of the turning ring 86 is supported on a lower seating ring 94, which in turn is maintained in position by a securing ring 90. The securing ring 90 is clamped in an annular groove 91 running around the interior circumference of the blind bore 87 and rotatably maintains the receiving element 14 on the turning ring 86. Together with the circumferential shoulder 89 of the turning ring 86, the lower seating ring 94 and the upper seating ring 92 form a rotary bearing.

The support arm 12 is designed to be hollow-cylindrical and can conduct (non-represented) electrical cables, for example, that can extend through the receiving bore 58 to the swivel joint 56, in which a through-opening 100, similar to the one in the housing 10, is formed for passing the cable through into the housing 10. Because damage to the cable can occur by an excessive turning of the receiving element 14 at the swivel joint 56, the swivel joint 56 is limited in its rotating ability by a restriction of its angle of rotation. An axially extending straight pin 96 is used for this purpose, which engages a (non-represented) guide groove in the swivel joint 56 and is attached to the lower end of the receiving element 14 facing the swivel joint 56.

The seating ring 50 running around in the circumferential, stepped-back, step-shaped recess 52 in the lower edge area 48, which faces the housing 10, of the receiving element 14, seals the swivel joint 56 against the housing 10. The receiving element 14 or the housing 10 can here be rotated relative to the sealing element 50.

Figure 3:
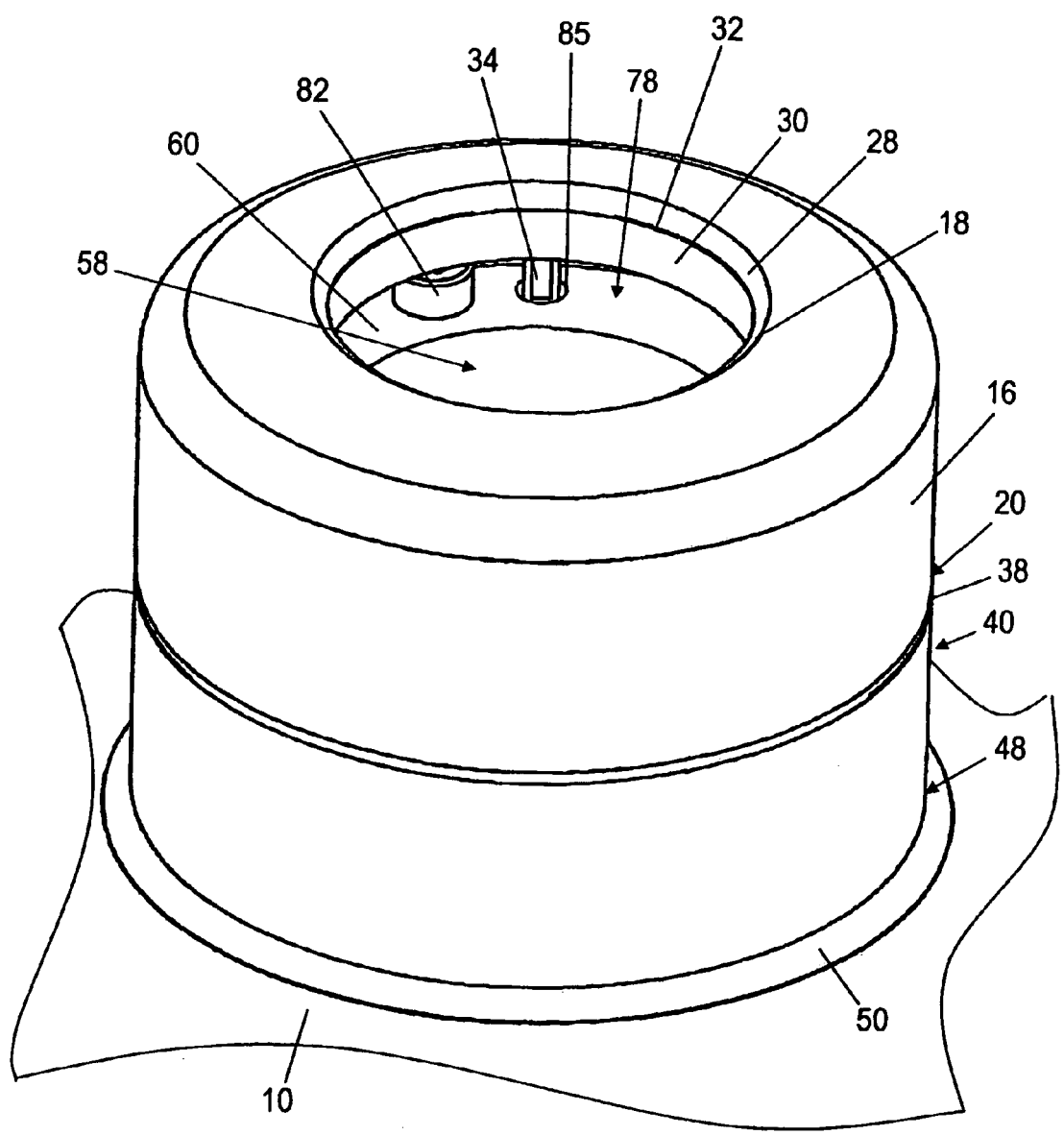
FIG. 3 shows the coupling element represented in FIGS. 1 and 2 in a schematic and perspective plan view, in which no support arm is received.

FIG. 3 shows the coupling element represented in FIGS. 1 and 2 in a schematic and perspective plan view, wherein the support arm is left out.

A plurality of threaded bores 85 extending in the axial direction are arranged on the circumferential collar-shaped shoulder 78 of the clamping element 60, of which only the threaded bore with the reference numeral 85 is shown in the representation in FIG. 3, which will be examined in greater detail. The cap screw 82 is shown to the left of the threaded bore 85 (in comparison with FIG. 1), which is screwed through the through-bore 80 in the collar-shaped shoulder 78 into the threaded bore 84 in the receiving element 14. The cap screw 82 maintains the sleeve-shaped clamping element 60 in the clamping position in the receiving bore 58. For releasing the sleeve-shaped clamping element 60 from its clamped position in the receiving bore 58, the cover 16 and the spacer 30 are lifted off the receiving element 14 and then the cap screw 82, which is screwed into the through-bore 80 at the circumferential collar-shaped shoulder 78, is screwed out of the threaded bore 84 at the front face 76 of the receiving element 14. Subsequently, the cap screw 82 is screwed into the adjoining threaded bore 85, during which the lower end of the cap screw 82 is supported on the front face 76 of the receiving element 14. The deeper the cap screw 82 is screwed into the threaded bores 85, the farther the clamping element 60 is lifted out of the receiving bore 58.

The spacer 30 is supported on the receiving element 14 by a plurality of spacing elements substantially extending in the axial direction, wherein only the spacing element with the reference numeral 34 is shown in FIG. 3. The spacing element 34 extends from the lower edge area of the spacer 30 through the threaded bore 85 in the circumferential collar-shaped shoulder 78 of the clamping element 60 as far as the front face 76 of the receiving element 14. In this case, the spacing element 34 is only plugged, not screwed, into the threaded bore 85.

German Patent Reference 10 2006 055 940.1-26, the priority document corresponding to this invention, and its teachings are incorporated, by reference, into this specification.

What is claimed is:

1. A coupling element of a support arm system for connecting a housing (10) or a support arm system element with a support arm (12), having a substantially hollow cylinder-shaped receiving element (14) fixable in place on the housing (10) or the support arm system element and for receiving and fixing in place the support arm (12) in an axial direction (arrow A), the coupling element comprising:
the receiving element (14) covered by a substantially cup-shaped cover (16) having a central through-opening (18) for passing the support arm (12) through and with an edge area (20) circumferentially supported on the receiving element (14), the through-opening (18) to be sealed against an exterior circumferential face (22) of the support arm (12), and the edge area (20) of the cover (16) sealed against the receiving element (14);
a circumferential sealing element (28) for placement between the exterior circumferential face (22) of the support arm (12) and an interior edge area (24) of the through-opening (18) formed out of the cover (16) supported on the receiving element (14); and
a spacer (30) arranged on a side of the cover (16) facing the receiving element (14) axially fixing the circumferential sealing element (28) against the interior edge area (24) of the through opening (18 of the cover (16), the spacer including a central through-opening (32) for leading the support arm (12) through and which is supported on the receiving element (14).

2. The coupling element in accordance with claim 1, wherein the spacer (30) is supported on the receiving element (14) by a plurality of spacing elements (34) substantially extending in the axial direction.

3. The coupling element in accordance with claim 2, wherein the sealing element (28) is an O-ring, and the interior area of the through-opening (18) formed out of the cover (16) has a circumferential recess (36) shaped as an arc of a circle for supportingly receiving the sealing element (28).

4. The coupling element in accordance with claim 3, wherein a circumferential sealing element (38) is arranged between the edge area (20) of the cover (16) and the receiving element (14).

5. The coupling element in accordance with claim 4 wherein a circumferential step-shaped recess (42) is formed in the edge area (40) of the receiving element (14) facing the cover (16), in which the edge area (20) of the cover (16) is received.

6. The coupling element in accordance with claim 5, wherein an exterior screw thread (43) is formed on the circumferential step-shaped recess (42) in the receiving element (14), and an interior screw thread (45) is formed on the interior edge area (20) of the cover (16), wherein the cover (16) is screwable onto the receiving element (14).

7. The coupling element in accordance with claim 6, wherein the sealing element (38) is arranged between the edge area (20) of the cover (16) and the circumferential, step-shaped recess (42).

8. The coupling element in accordance with claim 7, wherein a circumferential, step-shaped recess (46) is formed at an interior edge area (44) of the cover (16) in which the edge area (40) of the receiving element (14) facing the cover (16) is supported.

9. The coupling element in accordance with claim 8 wherein the sealing element (38) is an O-ring.

10. The coupling element in accordance with claim 9 wherein the receiving element (14) is sealable against the housing (10) or the support arm system element.

11. The coupling element in accordance with claim 10, wherein a circumferential sealing element (50) is arranged between the edge area (48) of the receiving element (14) for facing the housing (10) or the support arm system element and the housing (10) or the support arm system element.

12. The coupling element in accordance with claim 11, wherein a circumferential step-shaped recess (52) is formed between the edge area (48) of the receiving element (14) for facing the housing (10) or the support arm system element, in which the circumferential sealing element (50) is arranged and supported on the housing (10) or the support arm system element.

13. The coupling element in accordance with claim 12 wherein a connecting adapter having a clamping or screw connection is formed on the receiving element (14) for fixing the support arm (12) in place in the axial direction.

14. The coupling element in accordance with claim 13 wherein a connecting adapter (54) having a tapered or conical clamping connection for fixing the support arm (12) in place in the axial direction (arrow A) is in the receiving element (14).

15. The coupling element in accordance with claim 14 wherein a swivel joint (56) is arranged on an edge area (48) which faces the housing (10) of the receiving element (14), and fixes the receiving element (14) in place in the axial direction on the housing (10) and allows a rotation of the receiving element (14) about an axis of rotation (58) extending in the axial direction.

16. The coupling element in accordance with claim 15, wherein the circumferential sealing element (50) seals the swivel joint (56) against the housing (10) or the support arm system element, wherein the receiving element (14) or the housing (10) or the support arm system element can be rotated relative to the sealing element (50).

17. The coupling element in accordance with claim 1, wherein the sealing element (28) is an O-ring, and an interior area of the through-opening (18) formed out of the cover (16) has a circumferential recess (36) shaped as an arc of a circle for supportingly receiving the sealing element (28).

18. The coupling element in accordance with claim 1, wherein a circumferential sealing element (38) is arranged between the edge area (20) of the cover (16) and the receiving element (14).

19. The coupling element in accordance with claim 18 wherein the sealing element (38) is arranged between the edge area (20) of the cover (16) and the circumferential, step-shaped recess (42).

20. The coupling element in accordance with claim 18 wherein a circumferential, step-shaped recess (46) is formed at an interior edge area (44) of the cover (16) in which the edge area (40) of the receiving element (14) facing the cover (16) is supported.

21. The coupling element in accordance with claim 18, wherein the sealing element (38) is an O-ring.

22. The coupling element in accordance with claim 1, wherein the receiving element (14) is sealable against the housing (10) or the support arm system element.

23. The coupling element in accordance with claim 1, wherein a circumferential sealing element (50) is arranged between an edge area (48) of the receiving element (14) for facing the housing (10) or the support arm system element and the housing (10) or the support arm system element.

24. The coupling element in accordance with claim 1, wherein a connecting adapter having a clamping or screw connection is formed on the receiving element (14) for fixing the support arm (12) in place in the axial direction.

25. The coupling element in accordance with claim 1, wherein a connecting adapter (54) having a tapered or conical clamping connection for fixing the support arm (12) in place in the axial direction (arrow A) is in the receiving element (14).

26. The coupling element in accordance with claim 1, wherein a swivel joint (56) is arranged on an edge area (48) of the receiving element (14) for facing the housing (10), and fixes the receiving element (14) in place in the axial direction on the housing (10) and allows a rotation of the receiving element (14) about an axis of rotation (58) extending in the axial direction.

27. The coupling element in accordance with claim 26, further comprising a circumferential sealing element (50) for sealing the swivel joint (56) against the housing (10) or the support arm system element, wherein the receiving element (14) or the housing (10) or the support arm system element can be rotated relative to the sealing element (50).

* * * * *